UNITED STATES PATENT OFFICE.

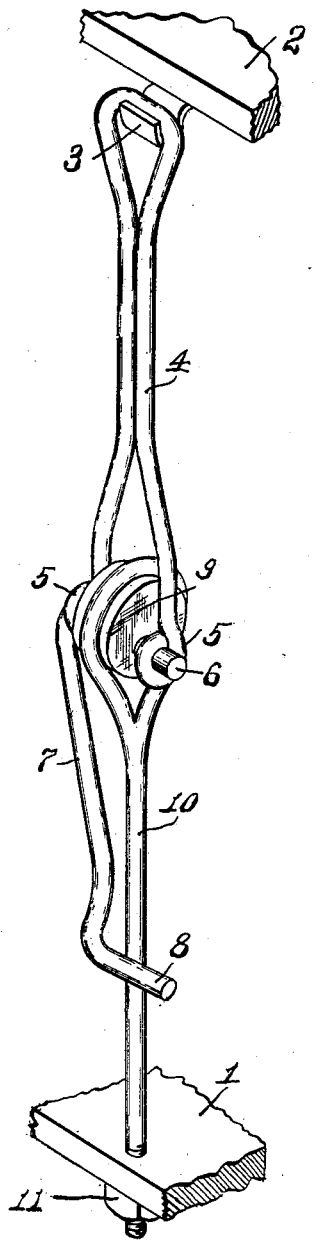

JOSEPH W. RANSON, OF BATAVIA, OHIO, ASSIGNOR OF ONE-HALF TO HARRY H. ELLWOOD, OF MIDDLETOWN, OHIO.

SEAT-LOCK.

SPECIFICATION forming part of Letters Patent No. 713,153, dated November 11, 1902.

Application filed August 25, 1902. Serial No. 120,885. (No model.)

*To all whom it may concern:*

Be it known that I, JOSEPH W. RANSON, a citizen of the United States, residing at Batavia, Clermont county, Ohio, have invented certain new and useful Improvements in Seat-Locks, of which the following is a specification.

This invention pertains to improvements in the construction of seat-locks of the toggle type for use in detachably securing the seats to the bodies of the vehicles; and the invention will be readily understood from the following description, taken in connection with the accompanying drawing, which is a perspective view of my improved seat-lock.

In the drawing, 1 indicates a portion of the body of the vehicle to which a seat is to be locked; 2, a portion of the seat; 3, a hook secured to the seat; 4, a bridle detachably engaging the hook 3 and projecting downwardly therefrom; 5, a pair of spindle-bearings formed on the bifurcated lower end of bridle 4; 6, a spindle journaled in the bearings 5; 7, a radial arm formed upon the spindle 6; 8, a handle formed at the free extremity of arm 7; 9, a peripherally-grooved eccentric fast on spindle 6; 10, an eyebolt having its upper end loosely engaging the peripheral groove of the eccentric and having its lower end engaging the body portion 1, and 11 a nut upon the eyebolt below the body portion 1 and serving to adjust the practical length of the eyebolt.

The nut 11 serves in adjusting the general length of the structure to such degree that when the swell of the eccentric is uppermost the entire system will be under tension and the seat will be locked firmly to the body. By actuating the handle the eccentric may be turned, thus increasing the general length of the system and releasing the seat from the clamping effect and permitting the bridle to be detached from the seat-hook. Handle 8 stops against eyebolt 10 and limits the angular attachment of the eccentric, and the angular relationship of the handle and eccentric center should be such that when the handle engages the eyebolt then the center of the eccentric has passed inwardly a trifle beyond the neutral line of strain, whereby the strain instead of tending to turn the eccentric and unlock the device tends to maintain it in locked position. There may be as many of these devices applied to a seat as the proper locking of the seat to the body calls for. In practice I apply one of the devices at each end of the seat.

I claim as my invention—

In a seat-lock, the combination, substantially as set forth, of a bridle having an end adapted to engage with a hook and having its other end bifurcated, spindle-bearings formed upon the bifurcated end of the bridle, a spindle mounted in said bearings and crossing the gap between said bearings, a peripherally-grooved eccentric fast on said spindle between said bearings, an eyebolt with its eye disposed between said bearings and engaging the groove of the eccentric, an arm upon the spindle outside one of said bearings, and a handle formed on the arm parallel with said spindle and adapted to engage the body of said eyebolt.

JOSEPH W. RANSON.

Witnesses:
NORMAN L. BURNET,
EDWIN C. ELY.